(12) United States Patent
Robb

(10) Patent No.: US 6,330,652 B1
(45) Date of Patent: *Dec. 11, 2001

(54) METHOD AND APPARATUS FOR HIGH-SPEED DATA QUEUING AND DATA RETRIEVAL

(75) Inventor: Terence A. Robb, Colorado Springs, CO (US)

(73) Assignee: MCI Communications Corporation, Washington, DC (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/063,866

(22) Filed: Apr. 22, 1998

(51) Int. Cl.[7] ........................................ G06F 12/08
(52) U.S. Cl. .................................. 711/169; 707/7
(58) Field of Search .................... 711/118, 140, 711/147, 169; 707/7; 710/52, 53

(56) References Cited

U.S. PATENT DOCUMENTS 5,084,815 * 1/1992 Mazzario ................................ 707/7

* cited by examiner

Primary Examiner—Kevin L. Ellis

(57) ABSTRACT

A high speed data queuing and retrieval system includes, in a lower tier, multiple storage devices for storing items for subsequent use by a requesting process, and multiple select devices for retrieving selected items in a pre-specified order from a corresponding storage device according to a requesting process, and, in an upper tier, multiple locally accessible storage devices for temporarily caching those items selected from the lower tier, and a select device for retrieving the selected items from the local storage device and feeding the requested items to the requesting process in a predefined sequence according to the request. The retrieval of the requested items from the local storage device is performed independent from and at a greater speed relative to the temporary caching of the selected items in the local storage device.

21 Claims, 4 Drawing Sheets

METHOD AND APPARATUS FOR HIGH-SPEED DATA QUEUING AND DATA RETRIEVAL

BACKGROUND OF THE INVENTION

1. Field of the Invention

The present invention relates generally to data storage and retrieval systems, for e.g., in a telecommunications network, and more particularly, to an improved method for high-speed data queuing and retrieval in a distributed network.

2. Discussion of the Prior Art

There are many applications in a telecommunications network that require high-speed data processing. Examples include the collection, sorting, and forwarding of call detail database records which contain, e.g., date, time, origination and termination of routing queries for customers of a telecommunications carrier. It is the case that hundreds of millions of these call records may be processed per day in a typical network. Another example is the distribution, storage, and retrieval of "items" for real-time call processing. In the context of this disclosure, "items" refer to data entities that are to be collected, sorted, and provided to a requesting object, i.e., network process, and may be objects, files, records, or any sort of data elements. In the context of telecommunications, for example, a requesting object can be an Automated Call Distributor (ACD) switch feature that distributes calls in one or more queues to one or more agents. Thus, in this context, items are calls in queues. Another example is a call record processing system that collects and processes call records generated from a plurality of network elements in a telecommunications network. One requirement that these different applications have in common is the need for high-speed data retrieval, e.g., from computer memory or magnetic/optical storage devices, and sorting. Data retrieval is often needed from temporary data queues that are distributed among a plurality of computers and/or data storage devices. Thus, data must be advantageously sorted as well.

A problem exists in that database mechanisms that write data to and read data from memory and storage devices are often too slow to meet the high-speed demands of data processing systems for telecommunications networks and other applications. Often, a single process or object needs to retrieve data from multiple data queues that are distributed among a plurality of computers or storage devices ("sources") that are accessed via a data network. Prior art systems which enable a software process or object to retrieve data from a single source or from multiple sources across a network using available database read/write mechanisms are just too slow to meet the high-speed demands of many of today's high-volume data processing applications.

It would be highly desirable to provide a data queuing and data retrieval method for networks requiring high-rates of data collection.

SUMMARY OF THE INVENTION

The present invention provides a data retrieval and sorting methodology for systems requiring high-rates of data collection, and to provide a queue management architecture for systems requiring high-rates of data collection.

In one embodiment of the invention a queue management structure implements a lower data storage tier that is completely partitioned from an upper data retrieval tier, enabling a data retrieval process to be performed at high speeds without interfering with, and without being interfered by, the data storage process.

In another embodiment of the invention the system includes a multi-tier queue management architecture a lower data storage and data selecting tier, an upper data storage and data selecting tier employing a quick cache storage device, and incorporates one or more intermediate tiers each having both a quick cache storage and data retrieval process for enabling efficient data retrieval of items from said lower level to said upper level in accordance with a pre-determined item select algorithm.

Still another embodiment of the invention provide a queue management architecture implementing one or more quick caches comprising items that have already been sorted, thus facilitating the data retrieval process.

Yet still another embodiment of the invention provides a queue management architecture that enables the use of multiple write/storage processes in parallel.

In accordance with a preferred aspect of the invention, there is provided a method for queuing and retrieving items in a network system executing process requests for the items, the method comprising the steps of utilizing one or more item select processes that each selectively retrieve items from corresponding one or more sources containing the items in accordance with a received request for the items; temporarily storing the selectively retrieved items to one or more memory cache units; and simultaneously feeding items from the one or more memory cache units to a requesting process in the network, the feeding step including selecting an item order in accordance with a sequence specified by said requesting process.

Advantageously, the method and apparatus of the invention greatly improves the data retrieval rate and sorting function for systems implementing slow read/write mechanisms.

BRIEF DESCRIPTION OF THE DRAWINGS

Further features and advantages of the invention will become more readily apparent from a consideration of the following detailed description set forth with reference to the accompanying drawings, which specify and show preferred embodiments of the invention, wherein like elements are designated by identical references throughout the drawings, and in which.

DETAILED DESCRIPTION OF THE INVENTION

Figure 1:
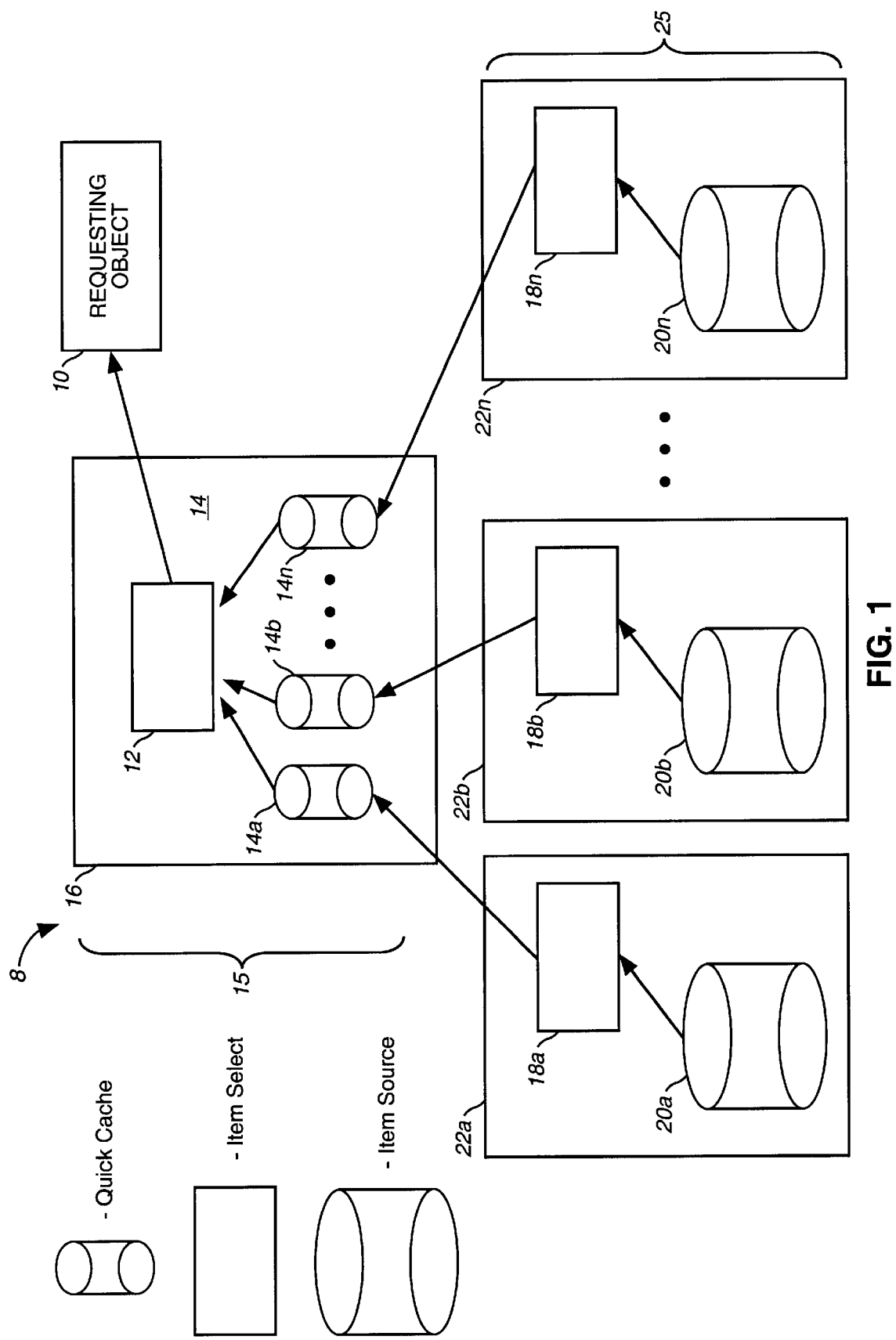
FIG. 1 illustrates the queue management architecture of the invention for performing data storage and retrieval.

As referred to herein, "items" refer to those data entities that are to be collected, sorted, and provided to a requesting object, and may comprise objects, files, records, or any other sort of data elements. As shown in FIG. 1, a requesting object 10 is a process that requests the collection of sorted data.

FIG. 1 illustrates the novel queue management system 8 implementing the data storage and retrieval method of the present invention. As shown in FIG. 1, the queue management system 8 comprises: a top-level item select tier 15 comprising: a computer 16 or like processing device having local memory storage 14 including one or more quick caches 14a, 14b, . . . 14n for storing items; and a top-level item select process 12 which is a software process that selects and retrieves items from the one or more quick caches 14a, 14b, . . . , 14n and feeds the sorted items to the requesting object 10; and a bottom-level item select tier 25 comprising: one or more data servers 22a, 22b, . . . , 22n each having a respective bottom-level item select processes 18a, 18b, . . . , 18n which are software processes that select items from corresponding item sources 20a, 20b, . . . , 20n, and feeds the sorted items to corresponding requesting objects, i.e., quick caches 14a, 14b, . . . 14n.

The purpose of the quick cache 14 is to provide items to the top-level item select process 12 from shared memory, or otherwise from a local source, thus obviating the need to transmit data over network links and incurring data latency. By utilizing this architecture, the speed with which the top-level item select process 12 can retrieve items is increased because the latency incurred with transmitting data over network links is removed. This latency is instead absorbed by bottom-level item select processes running simultaneous to the top-level item select process 12, for instance, a lower-level process that feeds items to the quick caches 14 from remote sources, so that the top-level item select process 12 can retrieve these items from the local shared memory 14. Although quick caches are usually areas of data storage in the local shared memory 14 of computer 16, it is understood that the quick caches 14a, 14b, . . . , 14n may alternately be stored on data storage devices, or computers other than computer 16, so long as they are local to the top-level item select process 12.

In the bottom-level item select tier 25, the bottom-level item select processes 18a, 18b, . . . , 18n feed items to corresponding quick caches 14 over data network lines, direct cable link, shared memory, or any other known means. Item Sources 20a, 20b, . . . , 20n are the source of items being requested by the requesting object 10 and may be databases, tables, files, objects, work queues, etc. located in areas of computer memory, data storage devices, etc. In the following example scenarios: 1) there may be one or more item sources 20 that comprise items requested by the requesting object 10; 2) there may be one or more bottom-level item select processes 18 that retrieve items from a single item source 20, and 3) there may be one or more item sources 20 from which items are retrieved by a single bottom-level item select process 18.

In accordance with the principles of the invention, each bottom-level item select process 18a, 18b, . . . , 18n implements logic to identify which of the items stored in an item source 20 is to be the next item processed. This logic may be of any form known in the data retrieval art including: hashing algorithms, indexed sequential access methods, etc. Accordingly, each bottom-level item select process 18a, 18b, . . . , 18n feeds items that have been already sorted to one or more quick caches 14a, 14b, . . . 14n. Consequently, the items in each quick cache 14a, 14b, . . . 14n are already sorted when the top-level item select process 12 retrieves them. The top-level item select process 12 also implements logic to identify which of the items stored in the quick caches 14a, 14b, . . . 14n should be the next item processed. Since all items in a single quick cache 14 are already sorted, the top-level item select process 12 only needs to compare the next (or top) item in each quick cache 14. This also contributes to the speed of data collection process of the present invention, as will be explained.

Preferably, each quick cache 14 is effectively a copy of the last n items selected from a particular item source 20. When an item has been selected and retrieved from a quick cache 14a, 14b, . . . , 14n by the top-level item select process 12, that quick cache retrieves a next selected item from its associated bottom-level item select process 18a, 18b, . . . , 18n for placement in sequence in the quick cache, since it comes from an already sorted source. In this way, each quick cache 14a, 14b, . . . , 14n constantly maintains n items in sequence. The top-level item select process 12 simply sequences the quick caches 14a, 14b, . . . , 14n from which it selects items.

According to the invention, it is preferred that the quick cache be prevented from becoming empty while items remain in an item source 20. Thus, in the queue management system, the capacity of each of the quick caches 14a, 14b, . . . , 14n, e.g., n items, is such that the item removal rate performed by the top-level item select process 12 does not exceed, beyond a predetermined threshold, the fill rate of that quick cache 14a, 14b, . . . , 14n. The requirement of preventing the quick cache from becoming empty while items remain in an item source 20 is facilitated by the fact that the top-level process 12 is a single process retrieving items from multiple quick caches 14, as compared to each quick cache 14a, 14b, . . . , 14n which has its own mechanism that writes items to it, albeit slower.

Figure 2:
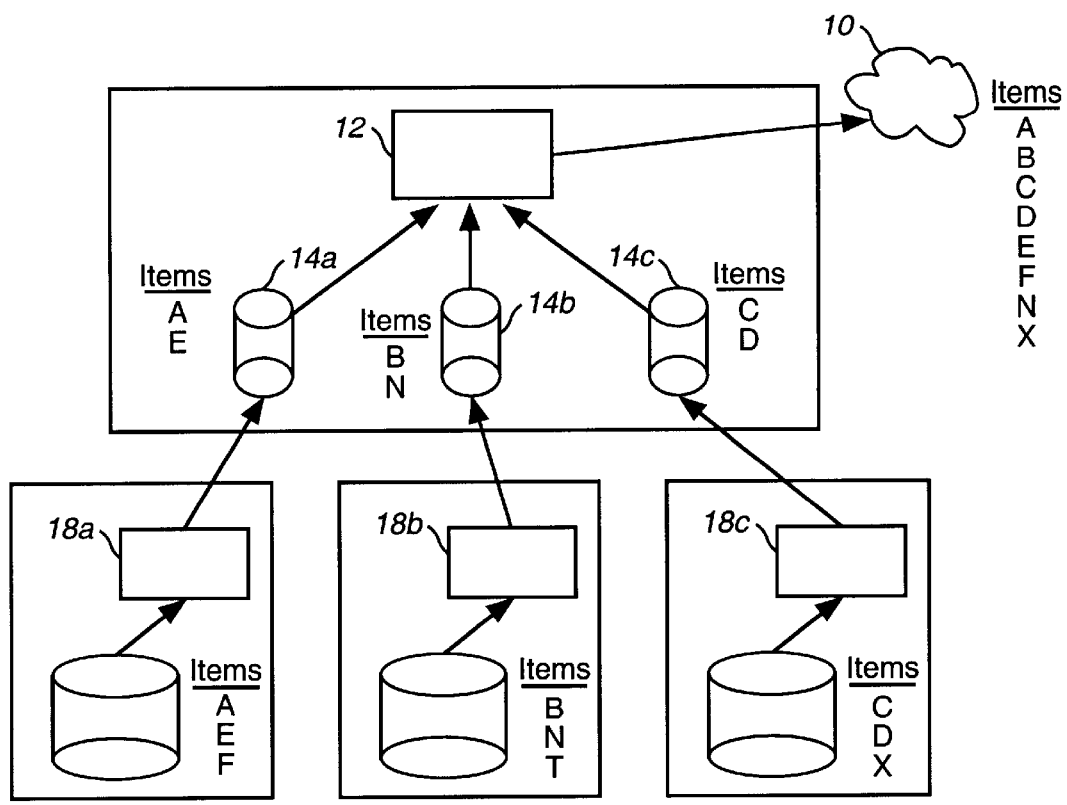
FIG. 2 illustrates an exemplary application implemented in the two-tier queue management architecture of the invention.

FIG. 2 is a diagram illustrating one example of a data storage and retrieval method implemented by the two-tier queue management architecture of FIG. 1 comprising three quick cache devices 14a–14c and corresponding bottom-level item select processes 18a–18c and item sources 20a–20c. As shown in FIG. 2, it is assumed that a requesting object 10 requires, for example, items A through X in a pre-specified sequence, e.g., alphabetical order. These items are stored in multiple item sources 20a–20c in random sequence, e.g., any item is written to any item source, for example. In accordance with the invention, each bottom-level item select process 18a–18c selects the next item in its corresponding item source, in the sequence as pre-specified. For example, bottom-level item select process 18a first selects item A, then item E, then item F as bottom-level item select process 18b concurrently selects items B, then item N, then item T, etc. Each bottom-level item select process 18a–18c then feeds its selected items to its corresponding quick cache, e.g., cache 14a, in that specified sequence. This retrieval process is controlled by the quick cache 14, so that a quick cache 14 will only retrieve and maintain a predetermined number of items. For example, as illustrated in FIG. 2, each quick cache 14 maintains two items with quick cache 14a maintaining items A and E, in sequence, and quick cache 14b maintaining items B and N, in sequence, etc.

It should be understood that each quick cache 14a–c is provided with intelligence that initiates requests for data from a lower-tier item select device in order to maintain the pre-determined amount of items therein. It should be apparent to skilled artisans that the optimum number of items a quick cache is programmed to maintain is based on one or more factors, including, but not limited to, the application that requests the items and the item retrieval rate, the latency incurred when feeding an item to a quick cache upon receipt of a request, the number and size of each quick cache, the structure of the item sources, etc. For example, implementing a design to increase performance may involve pre-sorting items in item sources 20a–20n in accordance with the predefined sorting algorithm of the requesting application. Although this would incur a time increase for each write process to the item sources, the item retrieval time performed by an item select process will be reduced.

Referring back to FIG. 2, the top-level Item Select process 12 then selects the top item in each quick cache 14a–14c in sequence. For example, in the state of the system shown in FIG. 2, the top-level item select process 12 first selects item A from quick cache 14a, then selects item B from quick cache 14b, then selects item C from quick cache 14c. As an item from a quick cache 14 is selected, that quick cache 14 retrieves the next item from a bottom-level item select processes 18. For example, when item C is selected from quick cache 14c, bottom-level item select process 18c writes item D to quick cache 14c. As a result of this exemplary method, the top-level item select process 12 writes items A through X in sequence to the requesting object 10.

In another embodiment, there may be more than one top-level item select process 12 removing items from an item source, i.e., a quick cache. Also, there may be multiple item sources available to one or more item select processes. In such an embodiment, the item source itself uses a data locking mechanism so that only one item select process can remove an item from an item source at any time. Since the item select processes are designed to remove one item at a time, the maximum number of item sources that are locked at any time is equal to the number of item select processes. This enables one to design a data processing architecture with a certain number of item select sources, i.e., local data caches, and select processes, so that minimal locking contentions occur, and so that an item select process does not sit idly waiting for access to an item source.

Figure 3:
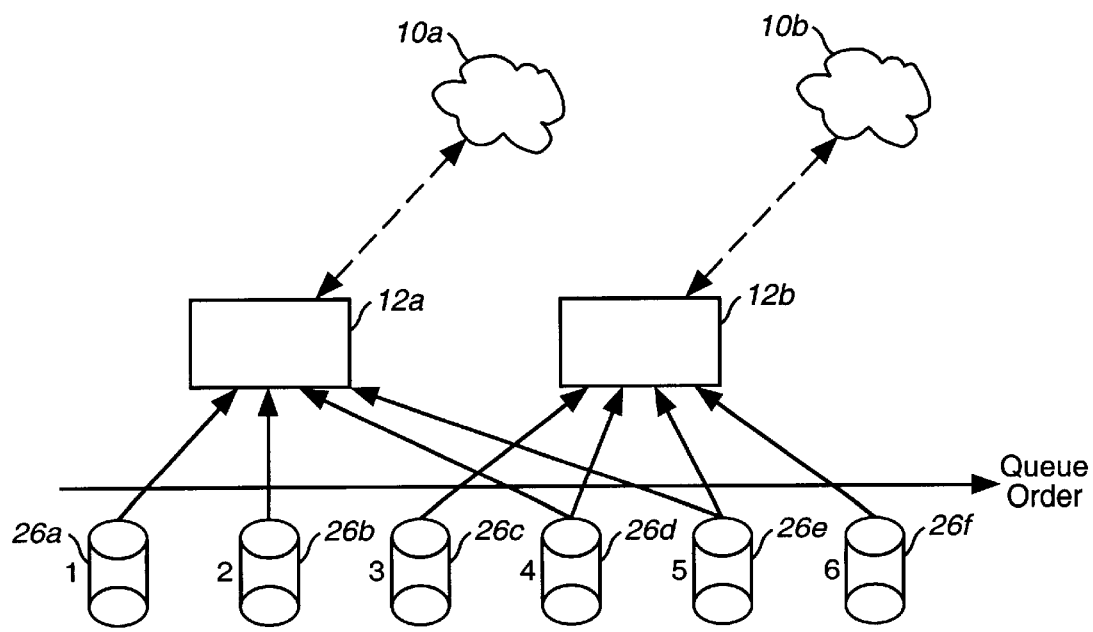
FIG. 3 illustrates a queue management architecture providing more than one top-level select item processes and retrieving data from local storage means.

FIG. 3 illustrates the queue management architecture 8 with a top-level item select tier 15' having two item select processes 12a and 12b and two or more local data cache or call "queues" with six queues 26a–26f being depicted in FIG. 3. In this embodiment, requesting object 10a is getting its feed from a top-level select item process 12a which is choosing from call queues having characteristics it can handle, and requesting object 10b is getting its feed from a top level select item process 12b which is choosing from call queues having characteristics it can handle. Thus, each call queue is designed so that one or more top-level select item processes 12a,b may remove items from that queue. This requires locking and ordering of queue examination to prevent deadlocks. For example, as shown in FIG. 3, if the following queues are locked in the sequential order 1, 2,3,4,5,6, then the two top-level select item processes 12a,b can remove items from six queues without a problem. Since the select is interested in picking a single item at a time, a maximum of two (2) queues are locked at any one time by a single "select item" process, i.e., the item select will lock only two queues at a time in order to make a comparison when selecting the next item to satisfy the sequence.

As another example, the queue management system 8 of FIG. 2 may be implemented as a call queuing system for operator services. In such an implementation, each item source 20a, . . . , 20n is a call queue for calls, e.g., of a respective single type. The bottom-level item select process 18a, . . . , 18n selects from its corresponding item source the call with the longest hold time. As a result, each quick cache 14a, . . . , 14n holds calls of a single type, in sequence according to hold times. The top-level item select process 12 selects the "top" or first call (the call with the longest holding time) in each quick cache in accordance with pre-defined business rules promulgated by the enterprise which specify those quick caches to select from in accordance with the types of calls being held there. As an example, a business rule may state:

"select call from Quick Cache 14a unless call in Quick Cache 14b has a wait time 2 minutes or more greater than the call in Quick Cache 14a."

In the context of telecommunications networks, the queue management system 8 may be configured to collect items such as billing and call detail records, e.g., from switches and other network elements (item sources). In such an example, the requesting process may be part of a billing or traffic reporting system to which these items are to be fed. Additionally, the queue management system 8 may be configured to collect items such as alarms from network elements which are to be fed to a requesting network manager and/or monitoring system.

In summary, the invention is particularly useful for systems that require a high rate of data collection for a requesting object. Data, or items, may be stored in multiple item sources using multiple write processes, thus mitigating the impact of slow write mechanisms. In addition, the mechanisms for storing data in item sources need not be concerned with sorting data. The latencies incurred with sorting data are minimized by 1) performing sorting at two levels: i) a top-level item select process and ii) bottom-level item select process, that each execute simultaneously; and 2) performing sorting among multiple bottom-level item select processes 18 in parallel. The latencies incurred with a requesting object 10 needing to retrieve items in sequence are minimized by providing the top-level item select process 12 with sorted data in each quick cache 14, thus reducing the number of items that the top-level item select process 12 needs to sort. Finally, the latencies incurred with both retrieving data from remote sources and slow read mechanisms are minimized by the quick caches 14 constantly maintaining n sorted items in local memory for the top-level item select process 12.

Figure 4:
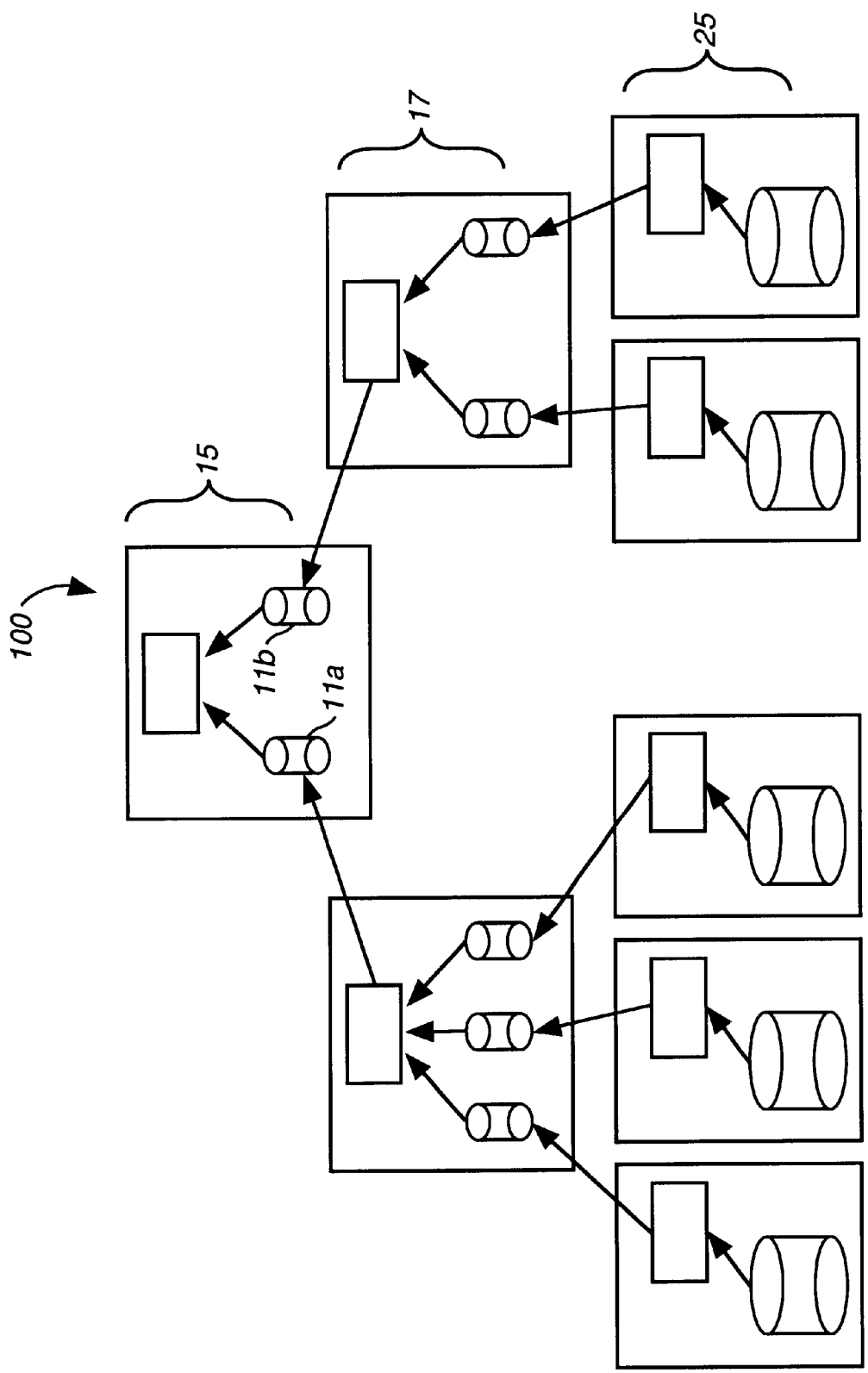
FIG. 4 illustrates a balanced three tier queue management architecture for performing data storage and retrieval.
Figure 5:
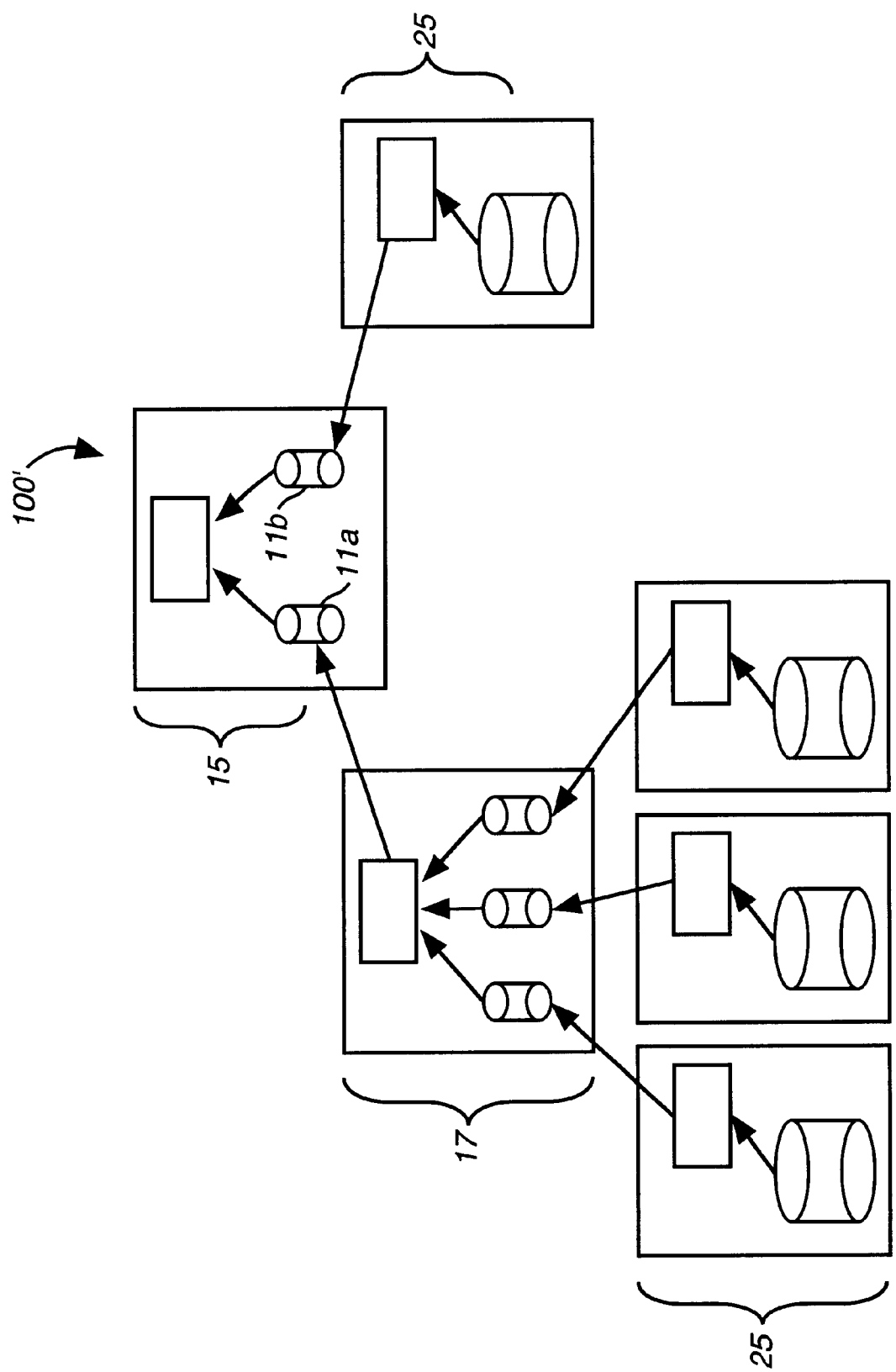
FIG. 5 illustrates an un-balanced three tier queue management architecture for performing data storage and retrieval.

While the invention has been particularly shown and described with respect to illustrative and preformed embodiments thereof, it will be understood by those skilled in the art that the foregoing and other changes in form and details may be made therein without departing from the spirit and scope of the invention which should be limited only by the scope of the appended claims. For instance, although a two-tier item select hierarchy is shown and described herein, it should be understood that additional levels may be incorporated into the hierarchy. FIG. 4 illustrates a three-tier implementation 100 which is 'balanced', i.e., each 'quick cache' 11a, 11b in the third layer 15 is reading from a select process in the second layer 17, which is in turn reading from another select process in a first layer 25. FIG. 5 illustrates a three-tier implementation 100' which is 'unbalanced', i.e., while one of the quick caches 11a in the third tier 15 is reading the results from a second tier 17, the other quick cache 11b is reading results from a first tier 25.

What is claimed is:

1. A multi-tier management system for storing items and retrieving items upon request in a distributed network, said system comprising:

a first partition having first storage means for storing said items for subsequent use by a requesting project, and first means for retrieving selected items from said first storage means in accordance with said request;

a second partition having second storage means for temporarily caching said selected items, and second means for retrieving said selected items from said second storage means and feeding said selected items to said requesting process in a predefined sequence in accordance with said request, wherein said retrieval of selected items from said second storage means is performed concurrently with said temporarily caching of said selected items in said second storage means thereby satisfying said request at a greater speed, and wherein the first means for retrieving the selected items is performed simultaneously with the second means for retrieving the selected items.

2. The system as claimed in claim 1, wherein said second storage means is located within said second partition proximate to said second retrieving means to facilitate high-speed access of said selected items therefrom upon a received process request.

3. The system as claimed in claim 1, further including control means for maintaining the size of said second storage means at a predetermined level, said means including means for monitoring a number of selected items retrieved from the second storage means relative to the amount of selected items being temporarily cached therein.

4. The system as claimed in claim 3, further comprising one or more first storage means, each first storage means having a corresponding first means for retrieving select items therefrom.

5. The system as claimed in claim 4, wherein said second storage means comprises one or more cache memory devices, each said cache memory device receiving said selected items from a corresponding first retrieving means.

6. The system as claimed in claim 5, wherein each said one or more cache memory devices are located in a shared memory device resident in said second partition.

7. The system as claimed in claim 5, wherein one or more of said cache devices are independently located proximate said second partition.

8. The system as claimed in claim 5, wherein a said first retrieving means pre-sorts said selected items from a corresponding said first storage means and inputs said selected items in said second storage means in said pre-sorted order for storage therein.

9. The system as claimed in claim 8, wherein said second retrieving means includes means for sorting said selected items prior to retrieving said items from said second storage means, an amount of sorting required by said second retrieving means to enable feeding of said selected items to said requesting process in said predefined sequence being minimized by said storing of selected items in said pre-sorted order.

10. The system as claimed in claim 3, wherein said retrieval of selected items from said second storage means is performed at a greater speed relative to said temporarily caching of said selected items in said second storage means.

11. The system as claimed in claim 1, further including a third partition having a third storage means for storing said items fed from said second partition, said third data storage means representing said requesting process requesting data from said first partition.

12. A method for queuing and retrieving items in a distributed network having a multi-tier queue management architecture, a system executing process requests for said items, said method comprising:

a) utilizing one or more item select processes that each selectively retrieve items from corresponding one or more sources comprising said items in accordance with a received request for said items;

b) temporarily storing said selectively retrieved items to one or more memory cache units; and c) concurrently feeding items from said one or more memory cache units to a requesting process in said network, said feeding including selecting an item order in accordance with a sequence specified by said requesting process, and wherein retrieving the selected items from the one or more sources occurs while simultaneously retrieving the selected items from the one or more memory cache units.

13. The method as claimed in claim 12, wherein step a) includes the step of pre-sorting said items in a said one or more sources prior to retrieving said items.

14. The method as claimed in claim 12, wherein said one or more memory cache units are located in a shared memory device local to accessible by a means for feeding said items to said requesting process.

15. The method as claimed in claim 13, wherein said step b) of temporarily storing said selectively retrieved items includes the step of one storing said items in a pre-sorted order.

16. The method as claimed in claim 15, wherein said means for feeding said items to said requesting process includes selecting a first item from each one or more memory cache units in said specified sequence.

17. The method as claimed in claim 15, further including the step of maintaining a predetermined number of items stored in a said memory cache unit, said maintaining step including immediately storing a next selectively retrieved item to that corresponding one or more memory cache units after feeding an item to said requesting process. selecting an item order in accordance with a sequence specified by said requesting process.

18. A multi-tier apparatus for queuing and retrieving items in a distributed network, a system executing process requests for said items, said apparatus comprising:

a) one or more item select means for selectively retrieving items from corresponding one or more item sources;

b) one or more local memory cache means for temporarily storing said selectively retrieved items; and, c) means for concurrently feeding items from a said one or more local memory cache means to a requesting process in said network, said feeding means selecting an item order in accordance with a sequence specified by said requesting process, wherein retrieving selected items from the one or more item sources occurs while simultaneously retrieving the selected items from the one or more local cache means.

19. The apparatus as claimed in claim 18, wherein each said one or more item select means selectively pre-sorts items in accordance with a received request prior to retrieving said items.

20. The apparatus as claimed in claim 18, wherein said selectively retrieved items are stored in a said one or more local memory cache means in said pre-sorted order, said feeding means selecting a first item in said order to thereby enable a faster feeding time to said requesting process.

21. The apparatus as claimed in claim 18, further including means for maintaining a predetermined number of items stored in a said local memory cache means, said maintaining means including immediately storing a next selectively retrieved item to a corresponding one or more memory cache units after feeding an item therefrom to a requesting process.

* * * * *